(No Model.)
W. A. REID.
PACKING FOR ICE MACHINES.
No. 275,269. Patented Apr. 3, 1883.
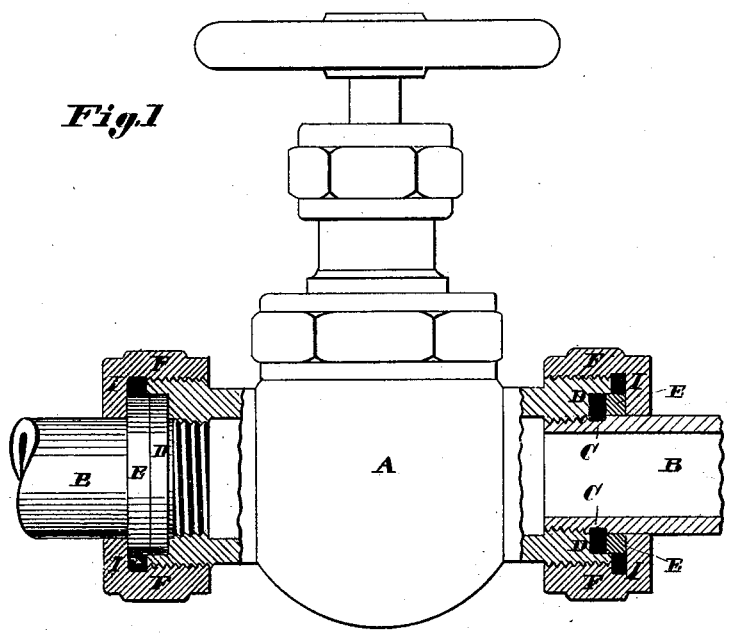
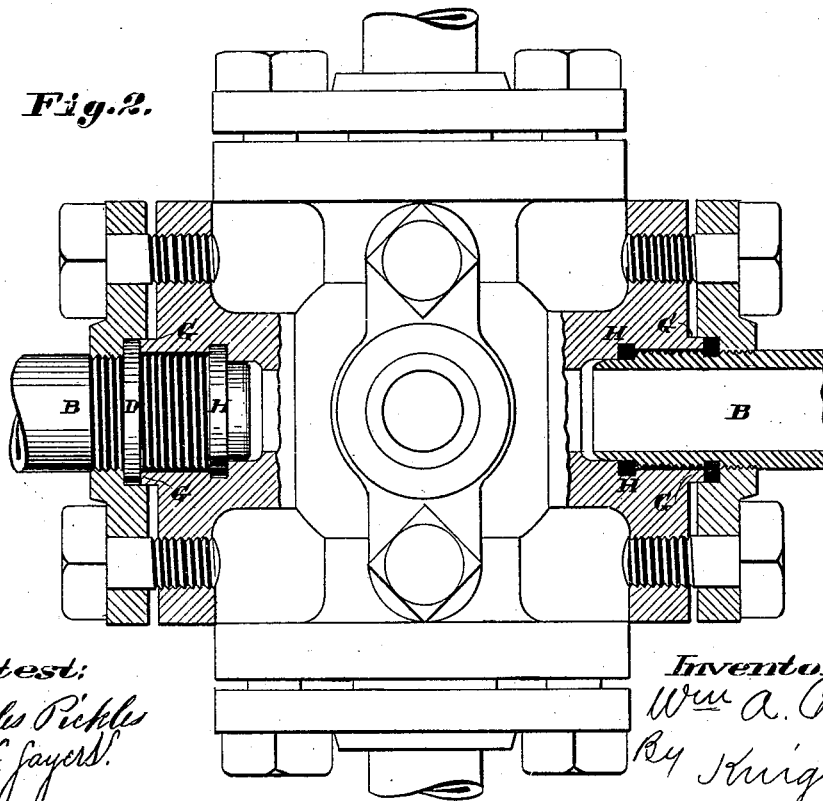
Attest:
Charles Pickles
Wm. G. Sayers
Inventor:
Wm. A. Reid
By Knight Bro
Attys

United States Patent Office.

WILLIAM A. REID, OF ST. LOUIS, MISSOURI, ASSIGNOR TO N. O. NELSON & CO., OF SAME PLACE.

PACKING FOR ICE-MACHINES.

SPECIFICATION forming part of Letters Patent No. 275,269, dated April 3, 1883.

Application filed December 27, 1882. (No model.)

*To all whom it may concern:*

Be it known that I, WILLIAM A. REID, of the city of St. Louis, in the State of Missouri, have invented a certain new and useful Improvement in Packing for Ice-Machines, &c., of which the following is a full, clear, and exact description, reference being had to the accompanying drawings, forming part of this specification, and in which—

Figure 1 is a side elevation, part in section, showing my invention applied to a valve or cock; and Fig. 2 is a similar view, showing my invention applied to a cross.

My invention relates to a packing more particularly intended for use on ice-machines, &c., where great difficulty is experienced in preventing joints from leaking.

My invention consists in points of novelty hereinafter described and claimed.

Referring to the drawings, A represents a cock with screw-threaded openings, as usual, to receive pipes B.

The object of my invention is to make a tight joint between the pipes and cock, for which purpose I provide the ends of the pipes (or pipe, if only one is used) with annular grooves C, just back of the threaded portions. In these grooves are placed rubber or other packings, D, and the openings of the cock are chambered out to receive these packings when the pipes are screwed into the cock. Before the packings are placed in the grooves of the pipes metal or other rings, E, are slipped over the pipe, and also couplings F, which are screw-threaded and fit over the necks of the cock. By screwing the couplings up tight the rings E are jammed tight against the packings, pressing them into the grooves of the pipes and against the cock, providing tight joints.

In Fig. 2 the invention is shown applied to a cross, and instead of the rings E necks G of the cross are employed, and in this modification additional packings, H, are used, which fit over the reduced ends of the pipes and in grooves in the openings of the cross.

Instead of the rings E, the couplings may be provided with annular projections or necks, which would jam against and act upon the packing in the same way as the rings.

With the construction shown in Fig. 1 there may be additional packings, I, used, which would be compressed between the couplings and the ends of the necks of the cock, as shown.

I claim as my invention—

1. The combination of pipe B, having annular groove C, packing D, fitting in the groove C, ring E, coupling F, and cock or other similar object, A, all substantially as shown and described, for the purpose set forth.

2. The combination of pipe B, having annular groove C, packing D, fitting in the groove C, ring E, coupling F, packing I, and cock or other similar object, A, all substantially as shown and described, for the purpose set forth.

WILLIAM A. REID.

In presence of—
SAML. KNIGHT,
GEO. H. KNIGHT